(12) United States Patent
Wolf et al.

(10) Patent No.: US 6,964,435 B2
(45) Date of Patent: Nov. 15, 2005

(54) COUPLING FOR CONNECTING HYDRAULIC DUCTS

(75) Inventors: Diethard Wolf, Lohmar (DE); Jörg Altenrath, Lohmar (DE); Recep Macit, Dusseldorf (DE)

(73) Assignee: Walterscheid Rohrverbindungstechnik GmbH (DE)

( * ) Notice: Subject to any disclaimer, the term of this patent is extended or adjusted under 35 U.S.C. 154(b) by 24 days.

(21) Appl. No.: 10/368,318

(22) Filed: Feb. 17, 2003

(65) Prior Publication Data

US 2003/0155763 A1 Aug. 21, 2003

(30) Foreign Application Priority Data

Feb. 18, 2002 (DE) ........................................ 102 06 852

(51) Int. Cl.$^7$ ................................................ F16I 35/00
(52) U.S. Cl. .......................... 285/39; 285/321; 285/320
(58) Field of Search ........................... 285/320, 39, 321

(56) References Cited

U.S. PATENT DOCUMENTS

| | | | | |
|---|---|---|---|---|
| 3,447,819 A | * | 6/1969 | Borsum et al. | 285/111 |
| 4,471,978 A | * | 9/1984 | Kramer | 285/321 |
| 5,401,063 A | | 3/1995 | Plosz | |
| 5,685,575 A | * | 11/1997 | Allread et al. | 285/39 |
| 5,934,709 A | * | 8/1999 | Morrison | 285/39 |
| 6,129,390 A | * | 10/2000 | Ohlsson | 285/39 |
| 6,186,557 B1 | * | 2/2001 | Funk | 285/39 |
| 6,237,964 B1 | * | 5/2001 | .O slashed.stergaard | 285/85 |
| 6,561,720 B2 | * | 5/2003 | Wirth et al. | 403/280 |
| 6,578,879 B2 | * | 6/2003 | Muto | 285/322 |
| 6,604,760 B2 | * | 8/2003 | Cresswell et al. | 285/305 |

FOREIGN PATENT DOCUMENTS

| | | |
|---|---|---|
| DE | 27 27 397 | 12/1977 |
| DE | 32 02 367 | 10/1982 |
| DE | 199 32 307 A1 | 1/2001 |
| FR | 1 486 149 | 6/1967 |
| JP | 54-31618 | 3/1979 |
| JP | 56-124789 | 9/1981 |
| JP | 3-52496 | 5/1991 |
| JP | 5-71588 | 9/1993 |
| JP | 2003-037024 | 9/2003 |
| WO | WO96/35906 | 11/1996 |
| WO | WO 96/35906 | 11/1996 |

* cited by examiner

Primary Examiner—James M. Hewitt
(74) Attorney, Agent, or Firm—Harness, Dickey & Pierce, P.L.C.

(57) ABSTRACT

A coupling for connecting hydraulic ducts has a first coupling element (1), in the form of a female coupling, with a receptacle (3) and a first locking face (10), and a second coupling element (2), in the form of a male coupling, The second coupling element (2) has an annular groove (9) that forms a second locking face (27) insertable into the receptacle (3). Several locking elements (10) are arranged in the annular groove (9). The locking elements (10) are held in the annular groove (9) and can be pivoted between a locking position and a releasing position. In the coupled condition of the coupling elements (1, 2), the first locking face (24) is axially supported on the second locking face (25). An unlocking sleeve (28) is displaceable between a locking position and a releasing position on the second coupling element (2). By moving the unlocking sleeve (28) from the locking position into the releasing position, the locking elements (10) are displaced from the locking position into the releasing position.

9 Claims, 6 Drawing Sheets

COUPLING FOR CONNECTING HYDRAULIC DUCTS

CROSS-REFERENCE TO RELATED APPLICATIONS

This application claims priority to German Patent Application No. 10206852.6 filed Feb. 18, 2002, which application is herein expressly incorporated by reference.

FIELD OF THE INVENTION

The invention relates to a coupling for connecting hydraulic ducts.

BACKGROUND OF THE INVENTION

WO 9635906 A1 describes a coupling for hydraulic ducts with a female coupling and a male coupling. The female coupling has a receptacle, into which the male coupling can be inserted through an opening in the receptacle. An inner circumferential groove is provided in the opening. A multitude of locking elements is inserted into the opening. The locking elements, in form of annular segments, are distributedly arranged around the circumference of the inner circumferential groove. The locking elements are supported in the circumferential direction on each other. Thus, the locking elements are held in the inner circumferential groove. The locking elements are springingly acted upon towards the inside by means of an elastic O-ring at the end of the inner circumferential groove, distanced from the opening. The locking elements form, in a locking position, a conical inner circumferential face and project partially from the inner circumferential groove to the inside.

The male coupling has a displacement face on its end. The displacement face interacts with the inner face of the locking element so that they are pivoted from the locking position towards the outside into a releasing position. In this position, the locking elements are completely arranged within the inner circumferential groove. Thus, the male coupling can be inserted into the opening. The male coupling, further, has an outer circumferential groove. The locking elements are pressed into the outer circumferential groove by means of the elastic O-ring, as soon as the male coupling is inserted far enough into the receptacle. In this position of the male coupling, the locking elements are axially supported on one side by the support face of the inner circumferential groove and on the other side by a locking face of the outer circumferential groove. Thus, the male coupling is retained against withdrawal.

A plastic ring is provided within the outer circumferential groove of the male coupling. The ring is narrower than the outer circumferential groove. If the male coupling is inserted further into the receptacle, the locking elements slide on the outer circumferential face of the plastic ring. Thus, the locking elements are moved into the releasing position. Since the friction force between the locking elements and the plastic ring is higher than the friction force between the plastic ring and the male coupling, the plastic ring glides, when withdrawing the male coupling, within the outer circumferential groove, until the plastic ring abuts the locking face of the outer circumferential groove. The outer diameter of the plastic ring is at least as large as the outer diameter of the male coupling at its end. Thus, when further pulling out the male coupling, the locking elements glide from the plastic ring onto the outer circumferential face of the male coupling and the male coupling can be completely pulled out.

A disadvantageous of this coupling is that when a locking element is lost, the residual locking elements are not held in the inner circumferential groove since they no longer support each other. Furthermore, the assembly of the individual locking elements is difficult because they must mount so that they support one another. Furthermore, the plastic ring is loaded by a high mechanical force during the coupling procedure. Thus, the outer diameter of the plastic ring may be reduced by wear off. Accordingly, it becomes smaller than the outer diameter of the male coupling. Due to wearing, a jamming of the male coupling may occur during withdrawal.

DE 199 32 307 A1 discloses a coupling with a female coupling having a receptacle to receive a male coupling. A circlip sits in an inner circumferential face of the receptacle. The circlip projects with a portion of its cross-sectional face protecting radially to the inside. The male coupling has, on its end, a displacement face. The displacement face pushes the circlip radially deeper into the inner circumferential groove during the insertion of the male coupling into the receptacle. This enables insertion of the male coupling. The male coupling has an outer circumferential groove. The circlip, after further insertion of the male coupling, enters into the outer circumferential groove. In this position, the circlip is supported axially on one side by the locking face of the outer circumferential groove and on the other side by the locking face of the inner circumferential groove. Thus, the male coupling is retained against withdrawal.

Starting from the receptacle opening, an annular gap is formed between the female coupling and the male coupling. An unlocking sleeve is inserted through the gap into the receptacle. Due to axial displacement of the unlocking sleeve into the receptacle, the circlip is axially moved along the conical locking face of the outer circumferential groove. Thus, the circlip is radially pushed out off the outer circumferential groove so that the male coupling can again be removed from the receptacle.

Since the locking face of the outer circumferential groove is formed as steep as possible towards the longitudinal axis, the angle that the conical locking face encloses is as large as possible. This ensures the best possible axial support of the circlip between the locking face of the outer circumferential groove and the locking face of the inner circumferential groove. A high force is necessary to push the circlip out off the outer circumferential groove. Furthermore, there is a danger that the circlip maybe widened. Thus, the circlip would not widened round, because it would be cut at one position. Thus, the ends of the circlip can lock between the locking faces.

SUMMARY OF THE INVENTION

It is an object of the invention to provide a coupling with two coupling elements and locking elements to connect hydraulic ducts. The two couplings can be easily assembled and the locking elements are securely held and have a long life.

According to the invention, a coupling for connecting hydraulic ducts defines a longitudinal axis and includes a first coupling element. The first coupling elements forms a first locking face circumferentially arranged around the longitudinal axis. A second coupling element can be coupled to the first coupling element. The second coupling element has an annular groove that forms a second locking face. A plurality of locking elements, in the form of annular segments, are arranged in the annular groove of the second coupling element. The locking elements each have a first longitudinal end. A holding mechanism engages the locking element on the first longitudinal end in the annular groove holding them together. The locking elements can be radially pivoted between a locking position and a releasing position. The locking elements are acted upon to take up the locking position. The locking elements include an abutment face. The abutment face interacts with the first coupling element to couple the second coupling element with the first coupling element so that each locking element can be moved from the locking position into the releasing position. The locking elements, in the coupled condition of the coupling elements, are axially supported on one side by the first locking face. The locking elements are axially supported on the other side by the second locking face. The first locking face and the second locking face oppose one another. An unlocking sleeve is axially displaceable relative to the second coupling element between a locking position and a releasing position. The unlocking sleeve interacts with the displacement faces of the locking elements so that by moving the unlocking sleeve from the locking position into the releasing portion the locking elements can be moved from the locking position into the releasing portion. The unlocking sleeve holds the locking elements, respectively, in the annular groove on a second longitudinal end axially distanced from the first longitudinal end.

The holding mechanism which engages the first longitudinal ends of the locking elements ensures that no locking element can be lost.

In order to enable easy assembly of the locking elements from the outside, the first coupling element is a female coupling. The female coupling includes an opening and a first locking face formed in a receptacle. The second coupling element is a male coupling that can be inserted, in the direction of the longitudinal axis, through the opening into the receptacle of the first coupling element.

The first coupling element, in form of a female coupling, can be provided as a separate component. The first coupling element can be connected to a hydraulic duct on a hydraulic hose. The first coupling element can, however, also be formed as an integral component of a valve block.

In a first embodiment of the invention, the holding mechanism is represented by an elastic ring. The elastic ring is arranged with a preloading around the locking elements and holds these in the annular groove.

Preferably the locking elements are pivotably held, respectively, around a pivot axis intersecting the longitudinal axis at a distance, between the locking position and the releasing position. The locking elements have a fulcrum portion. The elastic ring is arranged around the fulcrum portion of the locking elements. Therefore, the ring has two functions. On the one side it holds the locking elements in the annular groove and on the other side it acts upon the locking elements to take up their locking position by the preloading where the elastic ring sits on the fulcrum portions of the locking elements.

The holding mechanism which holds the locking elements in the annular groove can be represented by an elastic ring. The elastic ring is arranged around the locking elements with a preload to hold the locking elements in the annular groove.

To ensure, that a constant radial force acts on the locking elements, an O-ring can be used as the elastic ring. Furthermore, the use of a circlip, a spiral spring formed as a ring, or a similarly elastic annular element is possible.

In a second embodiment of the invention, the holding mechanism is represented by an undercut in the annular groove. The undercut engages the first longitudinal ends of the locking elements. The locking elements are pivotably held in the undercut. An elastic ring is arranged in the annular groove. The elastic ring acts upon the locking elements to take up their locking position.

To release the coupling from the outside, an annular groove is formed in the coupled condition of the two coupling elements. The annular groove starts from the opening of the first coupling element between the first coupling element and the second coupling element. The unlocking sleeve passes and projects from the receptacle at the annular groove.

The path along which the unlocking sleeve is axially displaceable can be limited. The unlocking sleeve, in the locking position, is axially supported by a shoulder of the second coupling element or on a securing ring. The securing ring rests in a circumferential groove of the second coupling element.

The unlocking sleeve includes an engaging surface for a tool to enable the unlocking sleeve to be moved by a tool such as a screwdriver or a specially adapted lever.

Furthermore, a coupling for connecting hydraulic ducts defines a longitudinal axis. A first coupling element, in the form of a coupling sleeve, has an opening and a receptacle with a first locking face circumferentially arranged around the longitudinal axis. A second coupling element, in form of a male coupling connector, has an annular groove. The annular groove forms a second locking face. The second coupling element can be inserted in the direction of the longitudinal axis through the opening into the receptacle of the first coupling element. A plurality of locking elements, in form of annular segments, are arranged in the annular groove of the second coupling element. The locking elements have a first longitudinal end. A holding mechanism engages the annular groove and holds the locking element on the first longitudinal end. The locking elements can be radially pivoted between a locking position and a releasing position. The locking elements are acted upon by the holding mechanism to take up the locking position. The locking elements have an abutment face that interacts with the first coupling element. Thus, when the second coupling element is inserted into the receptacle, each locking element can be moved from the locking position into the releasing position. The locking elements, in the coupled condition of the coupling elements, are axially supported on one side by the first locking face and on the other side by the second locking face.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
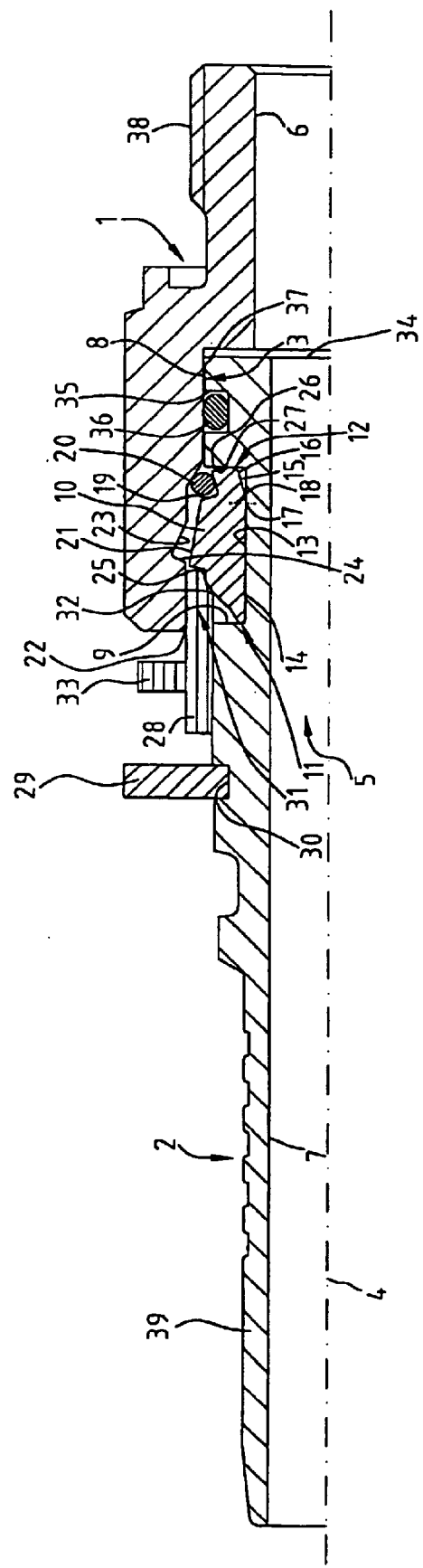
FIG. 1 is a longitudinal sectional view of a first embodiment of a coupling according to the invention in its releasing position.

FIG. 1 illustrates a coupling to connect hydraulic ducts according to the invention. The coupling includes a first coupling element 1, in the form of a female coupling, and a second coupling element 2, in the form of a male coupling. The first coupling element 1 has a receptacle 3, into which the second coupling element 2 is inserted in the direction of the longitudinal axis 4 through an opening 5. The first coupling element 1 has a first axial bore 6. The second coupling element 2 has a second axial bore 7, which, respectively, are connected to a hydraulic duct.

The second coupling element 2 has an outer circumferential face 8, with an annular groove 9. In the coupled condition of the coupling elements 1, 2 the annular groove 9 is arranged within the receptacle 3 of the first coupling element 1. A plurality of locking elements 10, in form of annular segments, are arranged in the annular groove. The locking elements 10 have, respectively, a first longitudinal end 11 as well as a second longitudinal end 12. The second longitudinal end 12 is the longitudinal end of the locking elements, which, in the coupled condition of the two coupling elements 1, 2, is arranged deeper within the receptacle 3.

A basal face 13 of the annular groove 9 is cylindrical and is coaxial with the longitudinal axis 4. The locking elements 10 have, respectively, a first inner face 14 and a second inner face 15. The first and second inner faces 14, 15 are arranged at an angle to each other. The first inner face 14 is represented by a lever arm portion 16. The lever arm portion 16 forms the second longitudinal end 12.

An edge 17 is formed between the first inner face 14 and the second inner face 15. A pivot axis 18 extends through the edge 17 (out of the drawing). The locking element 10 is pivotably arranged around the pivot axis 18 within the annular groove 9 on its basal face 13. The pivot axis 18 is at a distance spaced from and perpendicular to the longitudinal axis 4.

The locking elements 10 further include a recess 19. The recess 19 is formed in the fulcrum portion 16 and face away from the second inner face 15. An elastic ring, in the form of an O-ring 20, is received in the recess 19. The O-ring 20 encloses all the locking elements 10. The O-ring 20 is mounted with a preloading, so that the locking elements 10 are urged to take up a first tipping position. This is the locking position. In the first tipping position, the first inner face 14 abuts the basal face 13. In a second tipping position, the releasing position, the second inner face 15 abuts the basal face 13.

In the locking position of the locking elements 10, the locking elements project from the annular groove 9 beyond the outer circumferential face 8 of the first coupling element 1. When inserting the second coupling element 2 into the receptacle 3 of the first coupling element 3, the latter interacts with abutment faces 21 of the locking elements 10 to move into the releasing position. During this, an edge 22 of the opening 5 abuts the abutment faces 21 of the locking elements 10 and glides thereon, so that the locking elements 10 are pushed into the annular groove 9.

An inner circumferential groove 23 is provided in the coupling 1. The circumferential groove 32 forms a first locking face 24 that extends around the longitudinal axis 4. In the locking position of the locking elements 10, the locking elements 10, with a first support face 25, rest on the first locking face 24. During this, the first locking face 24 faces away from the opening 5 and the first support face 25 faces the first locking face 24. The locking elements 10 further form a second support face 26. The second support face 26 faces away from the first support face 25 and is supported on the second locking face 27. The second locking face 27 is formed by the annular groove 9. Therefore, in the coupled condition of the coupling elements 1, 2, the second coupling element 2 is retained against withdrawal from the receptacle 3 of the first coupling element 1.

An unlocking sleeve 28 is axially, displaceably guided between a locking position (FIG. 2) and a releasing position (FIG. 1) on the second coupling element 2. In the locking position, the unlocking sleeve 28 is supported axially on a securing ring 29, which rests in a groove 30 of the second coupling element 2. The securing ring 29 can also be substituted by a shoulder on the outer circumferential face 8 of the second coupling element 2. The unlocking sleeve 28 is inserted, from the outside, into an annular gap 31 formed between the first coupling element 1 and the second coupling element 2. The unlocking sleeve 28 partially covers the annular groove 9 and abuts, respectively, with the first longitudinal ends 11 of the locking elements 10. Thus, the locking elements 10 are held securely in the annular groove 9 on one side by the O-ring 20 and on the other side by the unlocking sleeve 28.

By displacing the unlocking sleeve 28 from the locking position into its releasing position the unlocking sleeve glides on a displacement face 32. The displacement face 32 faces away from the second support face 26. During displacement, the displacement face 32 interacts with the unlocking sleeve 28 so that the respective locking element 10 is displaced against the spring force of the O-ring 20 into the releasing position, pivoting the locking elements 10. In the releasing position of the locking elements 10, the locking elements are not supported on the first locking face 24 of the receptacle 3 as shown in FIG. 1. Thus, the second coupling element 2 can be withdrawn from the receptacle 3.

To facilitate the displacement of the unlocking sleeve 28 from the locking position into its releasing position, the unlocking sleeve 28 has an engaging mechanism 33, for a tool, in the form of a flange portion. Therefore, the unlocking sleeve 28 can be displaced by a screwdriver or a specially adapted lever.

A further circumferential groove 35 is provided on the outer circumferential face 8 of the second coupling element. The further circumferential groove 35 is positioned between the annular groove 9 and an end face 34 of the second coupling element 2. In the coupled condition of the coupling elements 1, 2, the further circumferential groove 35 is arranged within the receptacle 3. A sealing ring 36, in the groove 35, sealingly abuts an inner circumferential face 37 of the receptacle 3.

The first coupling element 1 includes a threaded portion 38. The threaded portion 38 connects the first coupling element to a hydraulic duct. The second coupling element has a connection portion 39 to connect with a hydraulic duct.

Figure 2:
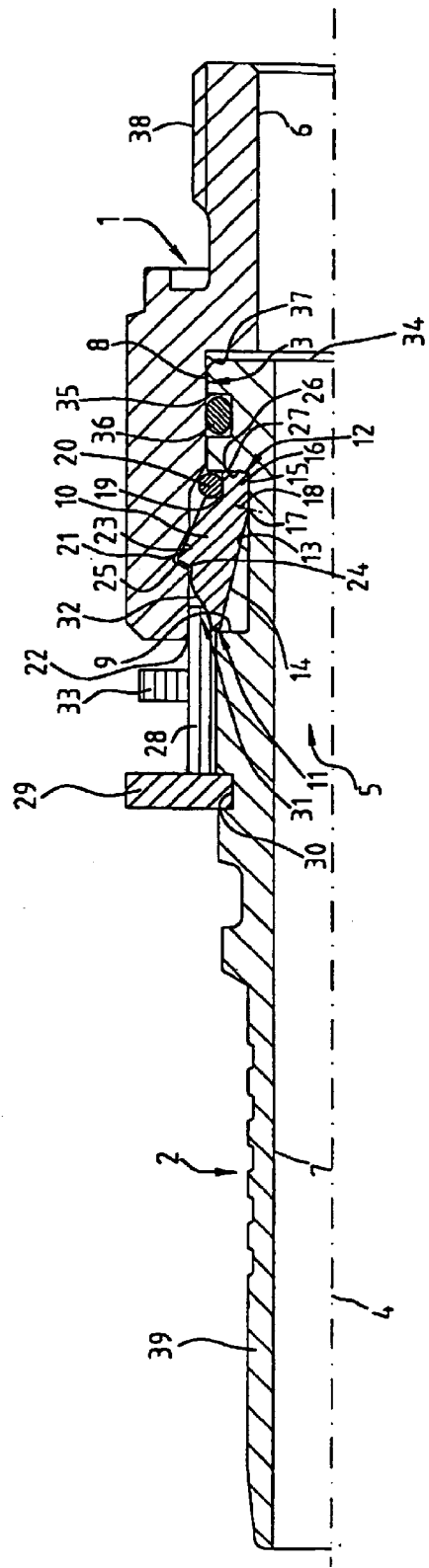
FIG. 2 is a longitudinal sectional view of the coupling according to FIG. 1, where the locking elements are in their locking position.
Figure 3:
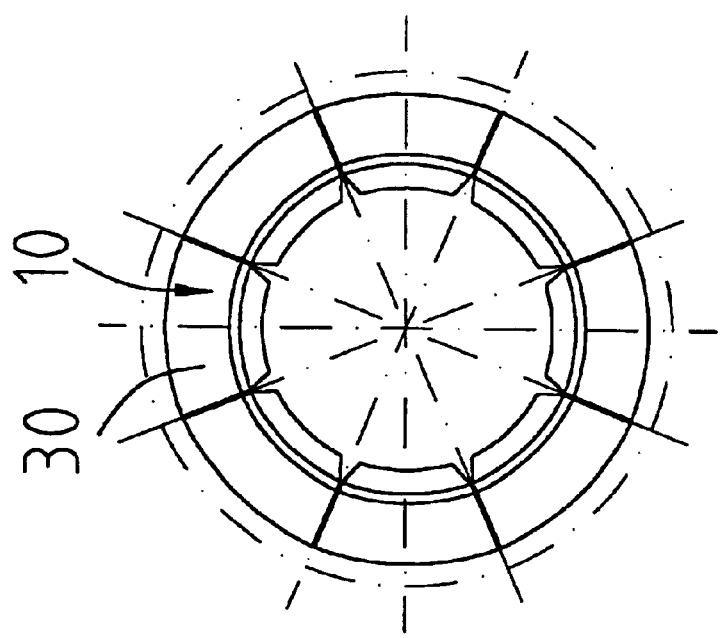
FIG. 3 is a front view of the locking elements of FIG. 1 in their releasing position.
Figure 4:
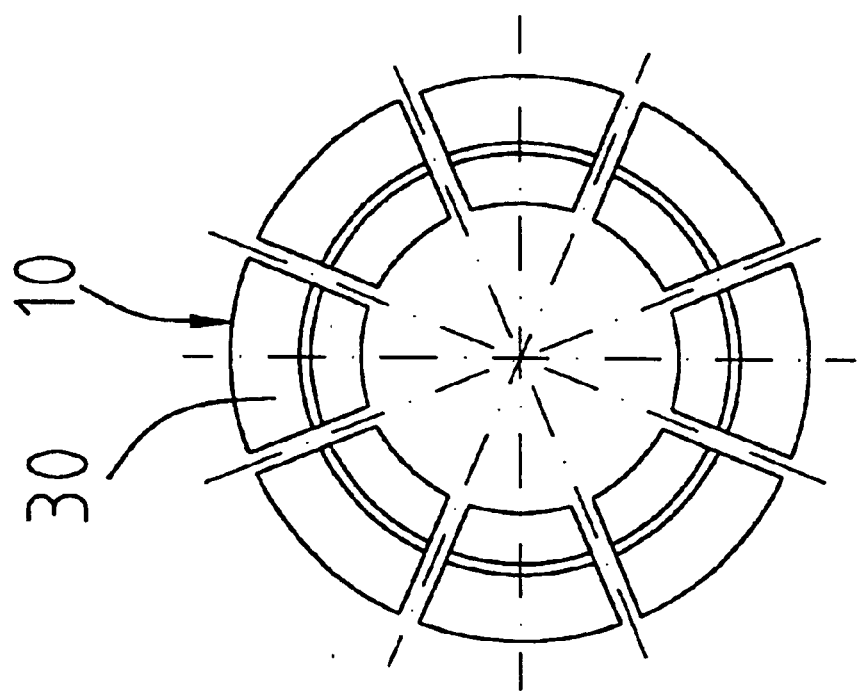
FIG. 4 is a front view of the locking elements of FIG. 2 in their locking position.

FIGS. 3 and 4 show a front view of the locking elements 10 according to FIGS. 1 and 2. FIG. 3 shows the locking elements in their releasing position. FIG. 4 shows the locking elements in their locking position. In the releasing portion, the individual locking elements 10, along the circumference, are supported on each other. In FIG. 4, the locking elements, in their locking position, are not supported on each other and do not abut each other.

Figure 5:
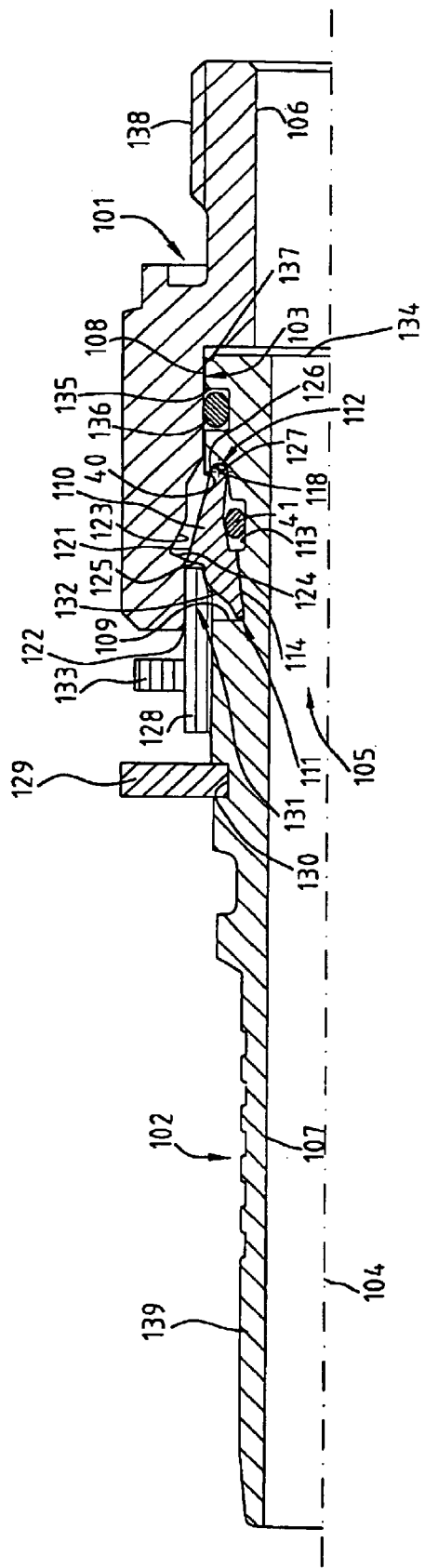
FIG. 5 is a longitudinal sectional view of a second embodiment of a coupling according to the invention.
Figure 6:
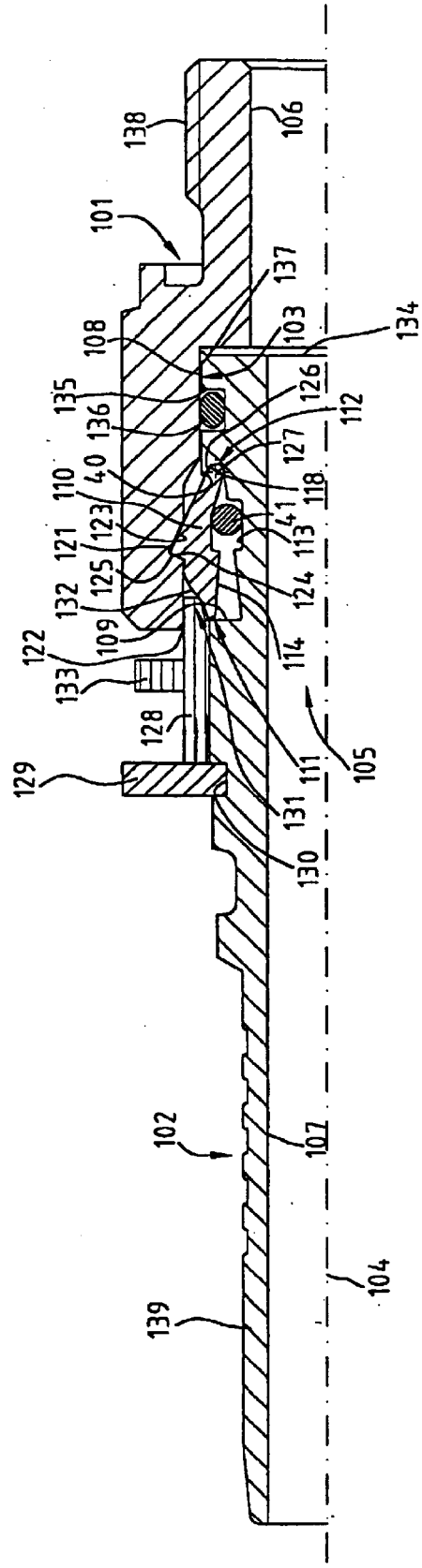
FIG. 6 is a longitudinal sectional view of a coupling of FIG. 5, with the locking elements in their locking position.

FIGS. 5 and 6 show a second embodiment of a coupling. The components which correspond to the components of FIGS. 1 to 4 are provided with reference numerals increased by the value 100.

The locking elements 110 via the second longitudinal ends 112 engage in an undercut 40. The undercut 40 is formed by the annular groove 109. The undercut 40 prevents the locking elements 110 from being moved radially out off the annular groove 109. Therefore, the locking elements 110 are held by the undercut 40 and the unlocking sleeve 128. An O-ring 41 is arranged in the annular groove 109 between the basal face 113 of the annular groove 109 and the individual locking elements 110. The O-ring 41 acts upon the locking elements 110 to urge them to take up their locking position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coupling for connecting hydraulic ducts comprising:
    a longitudinal axis;
    a first coupling element forming a first locking face circumferentially arranged around the longitudinal axis;
    a second coupling element for coupling with the first coupling element, said second coupling element including an annular groove forming a second locking face;
    a plurality of locking elements in the form of annular segments arranged in the annular groove of the second coupling element, said plurality of locking elements having a first longitudinal end and a second longitudinal end with a holding mechanism engaging the locking elements on the second longitudinal end holding the plurality of locking elements in the annular groove, said plurality of locking elements being radially pivoted between a locking position and a releasing position, wherein the plurality of locking elements are acted upon by the holding mechanism to take up the locking position, said plurality of locking elements having an abutment face interacting with the first coupling element wherein by coupling the second coupling element with the first coupling element said plurality of locking elements being moved from the locking position into the releasing position, said plurality of locking elements in the coupled condition of the coupling elements are axially supported on one side by the first locking face and on another side by the second locking face, wherein the first locking face and the second locking face face each other; and
    an unlocking sleeve axially displaceable relative to the second coupling element between a locking position and a releasing position, said unlocking sleeve interacting with displacement faces of said plurality of locking elements to move the unlocking sleeve from the locking position into the releasing position and the plurality of locking elements moving from the locking position into the releasing position, and said unlocking sleeve holding the locking elements on said first longitudinal end axially distanced from the second longitudinal end in the annular groove.

2. The coupling according to claim 1, wherein the first coupling element being a female coupling having a receptacle with the first locking face and an opening, and the second coupling element being a male coupling insertable in the direction of the longitudinal axis through the opening into the receptacle of the first coupling element.

3. The coupling according to claim 1, wherein the holding mechanism being an elastic ring arranged with a preloading around the plurality of locking elements holding said plurality of locking elements in the annular groove.

4. The coupling according to claim 3, wherein the plurality of the locking elements are pivotably held around a pivot axis spaced from the longitudinal axis and the plurality of locking elements have a lever arm portion around which the elastic ring is arranged.

5. The coupling according to claim 1, wherein the holding mechanism being an undercut in the annular groove, said second longitudinal ends of the locking elements engaging said undercut, and said plurality of locking elements being pivotably held in the undercut, and an elastic ring arranged in the annular groove, said elastic ring acting on the plurality of locking elements to take up their locking position.

6. The coupling according to claim 2, wherein the coupled condition of the two coupling elements starting from the opening of the first coupling element, an annular gap is formed between the first coupling element and the second coupling element, said unlocking sleeve through said annular gap projecting from the receptacle.

7. The coupling according to claim 1, wherein the unlocking sleeve in the locking position is axially supported by a securing ring which rests in a circumferential groove of the second coupling element.

8. The coupling according to claim 1, wherein the unlocking sleeve has a tool engaging mechanism.

9. A coupling for connecting hydraulic ducts comprising:
    a longitudinal axis;
    a first coupling element in the form of a female coupling having a receptacle with a first locking face arranged circumferentially around the longitudinal axis and having an opening;
    a second coupling element in the form of a male coupling having an annular groove forming a second locking face, said second coupling element being insertable in the direction of the longitudinal axis through the opening into the receptacle of the first coupling element;
    a plurality of locking elements in the form of annular segments arranged in the annular groove of the second coupling element, said plurality of locking elements having a first longitudinal end and a second longitudinal end receiving a holding mechanism, said holding mechanism engaging and holding the locking elements at the second longitudinal end in the annular groove, said plurality of locking elements being radially pivoted between a locking position and a releasing position, wherein the plurality of locking elements being acted upon by said holding mechanism to take up the locking position;
    said plurality of locking elements having an abutment face interacting with the first coupling element wherein when the second coupling element is inserted into the receptacle, said plurality of locking elements can be moved from the locking position into the releasing position, said plurality of locking elements in the coupled condition of the coupling elements are axially supported on one side by the first locking face and on the other side by the second locking face and an unlocking sleeve axially displaceable relative to the second coupling element between a locking position and a releasing position, said unlocking sleeve interacting with displacement faces of said plurality of locking elements to move the unlocking sleeve from the locking position into the releasing position and the plurality of locking elements moving from the locking position into the releasing position, and said unlocking sleeve holding the locking elements on said first longitudinal end axially distanced from the second longitudinal end in the annular groove.

* * * * *

UNITED STATES PATENT AND TRADEMARK OFFICE
CERTIFICATE OF CORRECTION

PATENT NO. : 6,964,435 B2  Page 1 of 1
APPLICATION NO. : 10/368318
DATED : November 15, 2005
INVENTOR(S) : Diehard Wolf et al.

It is certified that error appears in the above-identified patent and that said Letters Patent is hereby corrected as shown below:

Title page Item (56) References Cited, U.S. Patent Documents (Office Action dated 12/22/03, Notice of References Cited) "6,237,964  5/2001  .O slashed.stergaard" should be --6,237,964  5/2001  Østergaard--.

Title page Item (56) References Cited, U.S. Patent Documents (Information Disclosure Statement dated 10/7/03) "5,401,063  3/1995  Plosz" should be --5,401,063  3/1995  Plosz  285/81--.

Column 1, line 23, after "in", insert --the--.

Column 2, line 17, "protecting" should be --projecting--.

Column 2, line 60, "elements" should be --element--.

Column 4, line 27, after "in", insert --the--.

Column 4, line 31, after "in", insert --the--.

Column 5, line 55, "element 3" should be --element 1--.

Signed and Sealed this

Twenty-fourth Day of August, 2010

David J. Kappos
*Director of the United States Patent and Trademark Office*